(12) United States Patent
Willis et al.

(10) Patent No.: US 8,177,275 B2
(45) Date of Patent: May 15, 2012

(54) PARTITION FOR VEHICLE CARGO AREA

(75) Inventors: Thomas Michael Willis, Petersburg, MI (US); Robert H. Sautter, Jr., Cement City, MI (US)

(73) Assignee: Adrian Steel Company, Adrian, MI (US)

( * ) Notice: Subject to any disclaimer, the term of this patent is extended or adjusted under 35 U.S.C. 154(b) by 162 days.

(21) Appl. No.: 12/265,179

(22) Filed: Nov. 5, 2008

(65) Prior Publication Data

US 2009/0127880 A1  May 21, 2009

Related U.S. Application Data

(60) Provisional application No. 60/985,457, filed on Nov. 5, 2007.

(51) Int. Cl.
  *B60P 3/00* (2006.01)
  *A47G 5/00* (2006.01)
  *E06B 3/00* (2006.01)

(52) U.S. Cl. ............... 296/24.43; 160/351; 160/369; 160/DIG. 2

(58) Field of Classification Search ............ 160/351, 160/DIG. 2, 370.21, 104; 296/24.4, 24.43; 410/118, 129
See application file for complete search history.

(56) References Cited

U.S. PATENT DOCUMENTS

| | | | | |
|---|---|---|---|---|
| 2,865,670 A | * | 12/1958 | Dunn | 296/24.42 |
| 2,997,331 A | * | 8/1961 | Kudner | 296/24.46 |
| 2,998,279 A | * | 8/1961 | Mateny | 296/24.43 |
| 3,044,800 A | * | 7/1962 | Wicker | 280/748 |
| 3,169,781 A | * | 2/1965 | Abruzzino | 280/749 |
| 3,190,686 A | * | 6/1965 | Smiler | 296/24.46 |
| 3,190,687 A | * | 6/1965 | Johnson | 296/24.46 |
| 3,214,211 A | * | 10/1965 | Setina | 296/24.46 |
| 3,367,707 A | * | 2/1968 | Merriweather | 296/24.43 |
| 3,667,801 A | * | 6/1972 | Setina | 296/24.46 |
| RE27,942 E | * | 3/1974 | Setina | 296/24.42 |
| 4,015,875 A | * | 4/1977 | Setina | 296/24.46 |
| 4,035,014 A | * | 7/1977 | Sellers | 296/24.46 |
| 4,595,227 A | * | 6/1986 | Setina | 296/24.46 |
| 4,621,856 A | * | 11/1986 | McKenzie | 296/24.4 |
| 4,688,842 A | * | 8/1987 | Arbenius | 296/24.43 |
| 4,919,467 A | * | 4/1990 | Guimelli | 296/24.43 |
| 5,078,309 A | * | 1/1992 | Hull et al. | 224/482 |
| 5,393,013 A | * | 2/1995 | Schneider et al. | 244/118.5 |
| 5,735,564 A | * | 4/1998 | Coogan | 296/24.43 |
| 5,876,064 A | * | 3/1999 | Ament et al. | 280/749 |

(Continued)

OTHER PUBLICATIONS

Complementary. (n.d.). Dictionary.com Unabridged. Retrieved Aug. 5, 2010, from Dictionary.com website: http://dictionary.reference.com/browse/complementary (in the body of the Office Action).*

(Continued)

*Primary Examiner* — Blair M Johnson
*Assistant Examiner* — Jaime F Cardenas-Garcia
(74) *Attorney, Agent, or Firm* — Butzel Long

(57) ABSTRACT

A partition for separating the cabin compartment from the cargo area in HHR-style vehicles where the cabin compartment is characterized by a deck having a front wall and recesses. The partition comprises a frame including a panel. The frame is securable to a front wall of the vehicle deck, and includes at least one support, each of the at least one supports receivable in one of the recesses of the deck.

9 Claims, 3 Drawing Sheets

U.S. PATENT DOCUMENTS

| | | | | |
|---|---|---|---|---|
| 6,059,313 A * | 5/2000 | Coogan et al. | | 280/749 |
| 6,547,298 B2 * | 4/2003 | Sotiroff et al. | | 296/24.43 |
| 6,669,259 B2 * | 12/2003 | Murray et al. | | 296/24.46 |
| 6,796,589 B2 * | 9/2004 | Dolman | | 296/24.43 |
| 6,827,382 B2 * | 12/2004 | Murray et al. | | 296/24.46 |
| 6,983,969 B2 * | 1/2006 | Murray et al. | | 296/24.4 |
| 6,983,970 B2 * | 1/2006 | Bateman | | 296/24.43 |
| 7,017,520 B2 * | 3/2006 | Wang | | 119/412 |
| 7,059,646 B1 * | 6/2006 | DeLong et al. | | 296/24.43 |
| 7,195,297 B2 * | 3/2007 | Murray et al. | | 296/24.4 |
| 7,300,085 B2 * | 11/2007 | Giumelli | | 296/24.43 |
| 7,588,266 B2 * | 9/2009 | Fengel et al. | | 280/748 |
| 7,726,688 B2 * | 6/2010 | Setina | | 280/748 |
| 7,806,452 B2 * | 10/2010 | Storer et al. | | 296/24.43 |
| 2003/0057722 A1 * | 3/2003 | Dolman | | 296/24.1 |
| 2003/0090118 A1 * | 5/2003 | Murray et al. | | 296/24.1 |
| 2003/0090119 A1 * | 5/2003 | Bateman | | 296/24.1 |
| 2003/0141731 A1 * | 7/2003 | Betts et al. | | 296/24.1 |
| 2006/0108815 A1 * | 5/2006 | Giumelli | | 296/24.4 |
| 2006/0214448 A1 * | 9/2006 | Murray et al. | | 296/24.43 |
| 2007/0057499 A1 * | 3/2007 | Fengel et al. | | 280/749 |
| 2007/0176450 A1 * | 8/2007 | Setina | | 296/24.46 |
| 2007/0194583 A1 * | 8/2007 | Coles et al. | | 296/24.43 |
| 2007/0210597 A1 * | 9/2007 | Wang | | 296/24.43 |

OTHER PUBLICATIONS

Complimentary. (n.d.). Dictionary.com Unabridged. Retrieved Aug. 5, 2010, from Dictionary.com website: http://dictionary.reference.com/browse/complimentary (in the body of the Office Action).*

* cited by examiner

PARTITION FOR VEHICLE CARGO AREA

CROSS-REFERENCE TO RELATED APPLICATIONS

This application is related to, and claims the benefit of priority from, U.S. Provisional Patent Application Ser. No. 60/985,457, filed Nov. 5, 2007, the disclosure of which application is incorporated herein by reference in its entirety.

TECHNICAL FIELD

The present invention relates to partitions for work vehicles which separate cab areas from cargo areas.

BACKGROUND ART

Numerous separate devices dividing the driver's (cabin) compartment and the cargo area of vans and other vehicles have been utilized in the past. The purposes of these devices were to confine cargo in the proper area in case of accident, promote security, and attempt to maintain a temperature control in the driver's compartment.

These devices have been manufactured or designed with metal, aluminum, and fiberglass, either screwed or bolted to Plexiglass to provide rear view vision. These partitions in many cases required, at best, awkward manufacturing techniques, and did not necessarily achieve what they were designed for.

The present invention is directed to a partition that separates the cab area from the cargo area of a work vehicle which partition is designed and configured to be installed into heritage high roof ("HHR") style vans without the requirement of any drilling for installation.

SUMMARY OF THE DISCLOSURE

According to various features, characteristics and embodiments of the present invention which will become apparent as the description thereof proceeds, the present invention provides a partition for separating the cabin area from the cargo area in the interior of HHR-style vehicles where the cargo area is characterized by a deck having a front wall and recesses. The partition comprises a frame including a panel, and the frame being securable to the front wall of the vehicle deck. The frame includes at least one support, each said at least one support receivable in one of the recesses of the deck.

According to one feature of the present invention, the partition comprises support braces on a lower portion of the frame, the support braces adapted to fit over the front wall of the vehicle deck. The support braces may each comprise an inverted channel dimensioned to be received over the deck's front wall. The support braces may also include openings therethrough for receiving fasteners.

Per still another feature, the at least one support comprises a pair of support arms which extend downwardly in relation to the support braces, each support arm dimensioned to be received in one of the recesses of the deck. Each support arm may, per another feature, include a biasing member adapted to bias the arm in position within a recess of the deck. The biasing member may comprise a bent brace.

According to another feature of the invention, side braces extend between the frame and the support braces.

Per a further feature hereof, the frame has a shape that is complimentary to the shape of the interior of the HHR vehicle.

According to a still further feature, the panel comprises a perforated panel.

BRIEF DESCRIPTION OF DRAWINGS

The present invention will be described with reference to the attached drawings which are given as non-limiting examples only, and in which.

DETAILED DESCRIPTION

The present invention is directed to partitions for work vehicles which separate cab areas from cargo areas. The partitions of the present invention are specifically designed for use in HHR-type panel vans and are particularly designed so that they can be installed without requiring drilling for installation. Moreover, the partitions of the present invention are designed for easy installation using existing fastening holes and are compatible with side curtain airbags and allow full access to cargo compartments.

As required, detailed embodiments of the present invention are disclosed herein; however, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
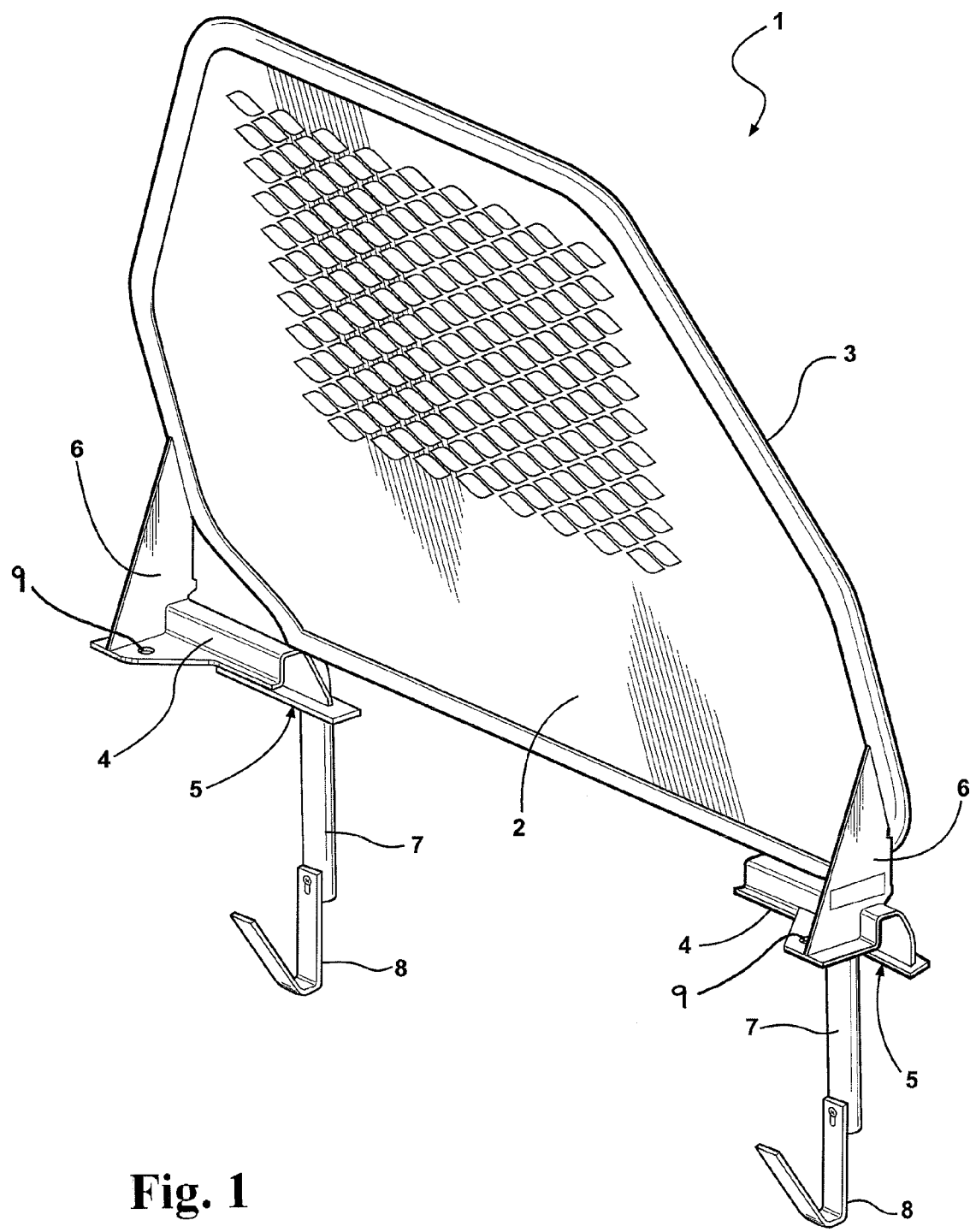
FIG. 1 is a perspective view of a partition according to one embodiment of the present invention.

FIG. 1 is a perspective view of a partition according to one embodiment of the present invention. The partition 1 comprises a perforated panel 2 that can be made of steel and is framed by a tubular frame 3. The tubular frame 3, which can be made from steel, is contoured to be complimentarily shaped to the interior, cabin space of an HHR van (see FIG. 4). The frame 3 is coupled to support braces 4 on either side at the bottom of the frame 3. The support braces 4 are configured to rest on top of the raised deck 10 that is provided in HHR vans (FIGS. 2 and 3).

Figure 2:
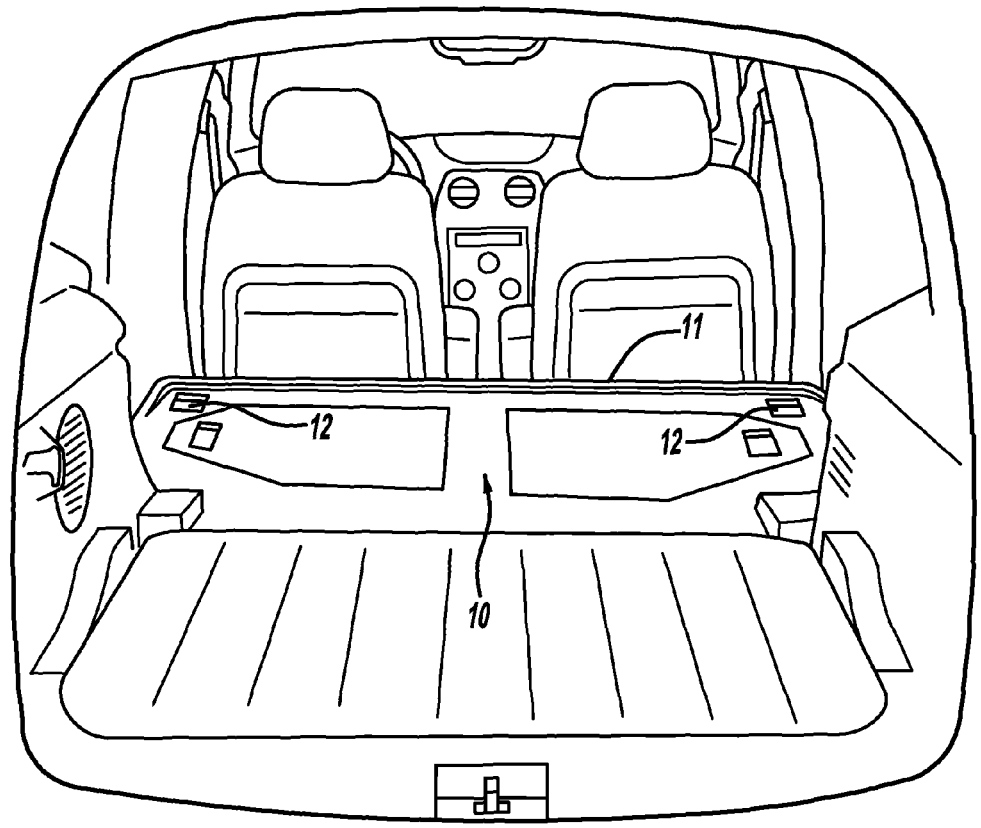
FIG. 2 depicts the interior compartment of an HHR-type vehicle as seen through the rear door, showing both the cargo and cab areas.
Figure 3:
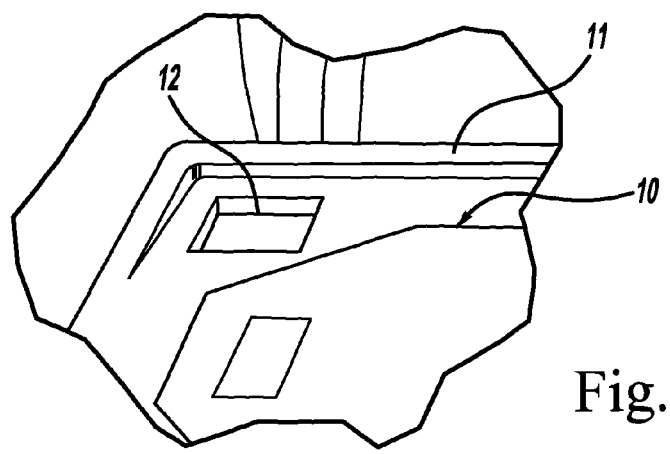
FIG. 3 is a detailed view of an area of the deck of the HHR-type vehicle of FIG. 2, showing particularly one of the recesses and a portion of the front wall thereof.

The support braces 4 are configured to have inverted channels 5 that are configured to fit over the top of the front wall 11 of the raised decks 10 of HHR vans (FIGS. 2 and 3). The support braces 4 further have side braces 6 which support the position of the partition 1. As shown best in FIG. 1, the partition 1 is configured to be tilted rearward in order to allow for reclined seat positions and to avoid obstruction of side window curtains.

The partition 1 further includes support arms 7 that extend downward at opposite sides from the support braces 4. These support arms 7 include bent braces 8. The support arms 7 are configured to be received in recesses 12 that are provided in the raised decks 10 of HHR vans (FIGS. 2 and 3). The bent braces 8 are configured to bias the support arms 7 against the front sides of the recesses 12 so as to stabilize the partition 1.

In addition, the bent braces 8 resist the support arms 7 from being pulled out of the recesses 11.

Figure 4:
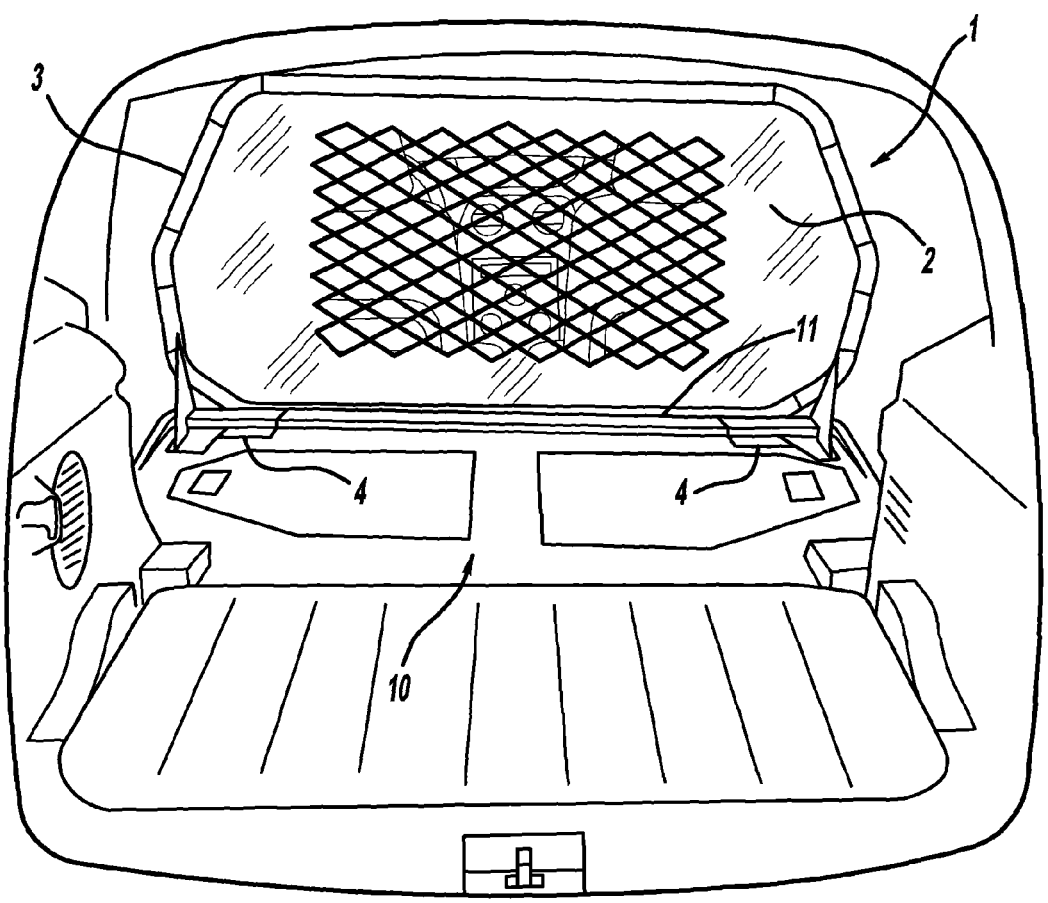
FIG. 4 depicts the interior of an HHR-type vehicle as seen in FIG. 2, and wherein the partition of the present invention has been installed.

The partition 1 of the present invention can be installed by inserting the support arms 7 and bent braces 8 into the recesses 11 of a standard raised deck 10 of an HHR van (FIGS. 2 through 4). Afterwards, if desired, threaded members can be inserted through holes 9 into the raised deck 10.

The elements of the partition 1 can be made from any suitable rigid material, with metals being preferred. The panel can be made from steel with perforations, as shown, providing visibility and light to the cargo area. In alternative embodiments, a window can be provided in place of the perforations, or an access door or panel.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

The invention in which an exclusive property or privilege is claimed is defined as follows:

1. A partition to separate a cabin area from a cargo area in the interior of a vehicle having a horizontally oriented deck, the partition comprising:
   a panel;
   a tubular frame positioned around a perimeter of the panel, wherein the tubular frame includes an upper portion and an opposed lower portion;
   a support brace positioned adjacent the lower portion of the tubular frame;
   a support arm extending downwardly from the support brace and perpendicular thereto; and
   a bent brace having a "V" shape coupled to a lower end of the support arm, wherein the partition is positioned on an upper surface of the deck such that the support brace is adjacent the upper surface of the deck and the support arm is received within a corresponding recess in the deck such that the bent brace retains the support arm below a lower surface of the deck and baises the support arm against a front side of the recess in the deck.

2. The partition of claim 1, wherein the support brace includes an inverted channel that fits over a front wall formed in the deck.

3. The partition of claim 1, further including a side brace extending between the frame and the support brace.

4. The partition of claim 1, wherein the panel comprises a perforated panel.

5. The partition of claim 1, wherein the support arm extends downwardly from the support brace in a first direction, and the majority of the frame is oriented in a plane angled relative to the first direction.

6. A partition to separate a cabin area from a cargo area in the interior of a vehicle having a horizontally oriented deck, the partition comprising:
   a panel;
   a tubular frame positioned around a perimeter of the panel, wherein the tubular frame includes an upper portion and an opposed lower portion;
   a support brace positioned adjacent the lower portion of the tubular frame;
   a support arm extending downwardly from the support brace and perpendicular thereto in a first direction a majority of the fame is oriented in a plane angled relative to the first direction; and
   a bent brace having a "V" shape coupled to a lower end of the support arm, wherein the partition is positioned on an upper surface of the deck such that the support brace is adjacent the upper surface of the deck and the support arm is received within a corresponding recess in the deck such that the bent brace retains the support arm below a lower surface of the deck and biases the support arm against a front side of the recess in the deck.

7. The partition of claim 6, wherein the support brace includes a longitudinally extending, inverted channel, that fits over a front wall formed in the deck.

8. The partition of claim 6, further including a side brace extending between the frame and the support brace.

9. The partition of claim 6 further comprising a plurality of support arms.

* * * * *